Dec. 2, 1969    N. B. CONSTANTINO    3,481,092
CEILING MOLDING
Filed Feb. 1, 1968
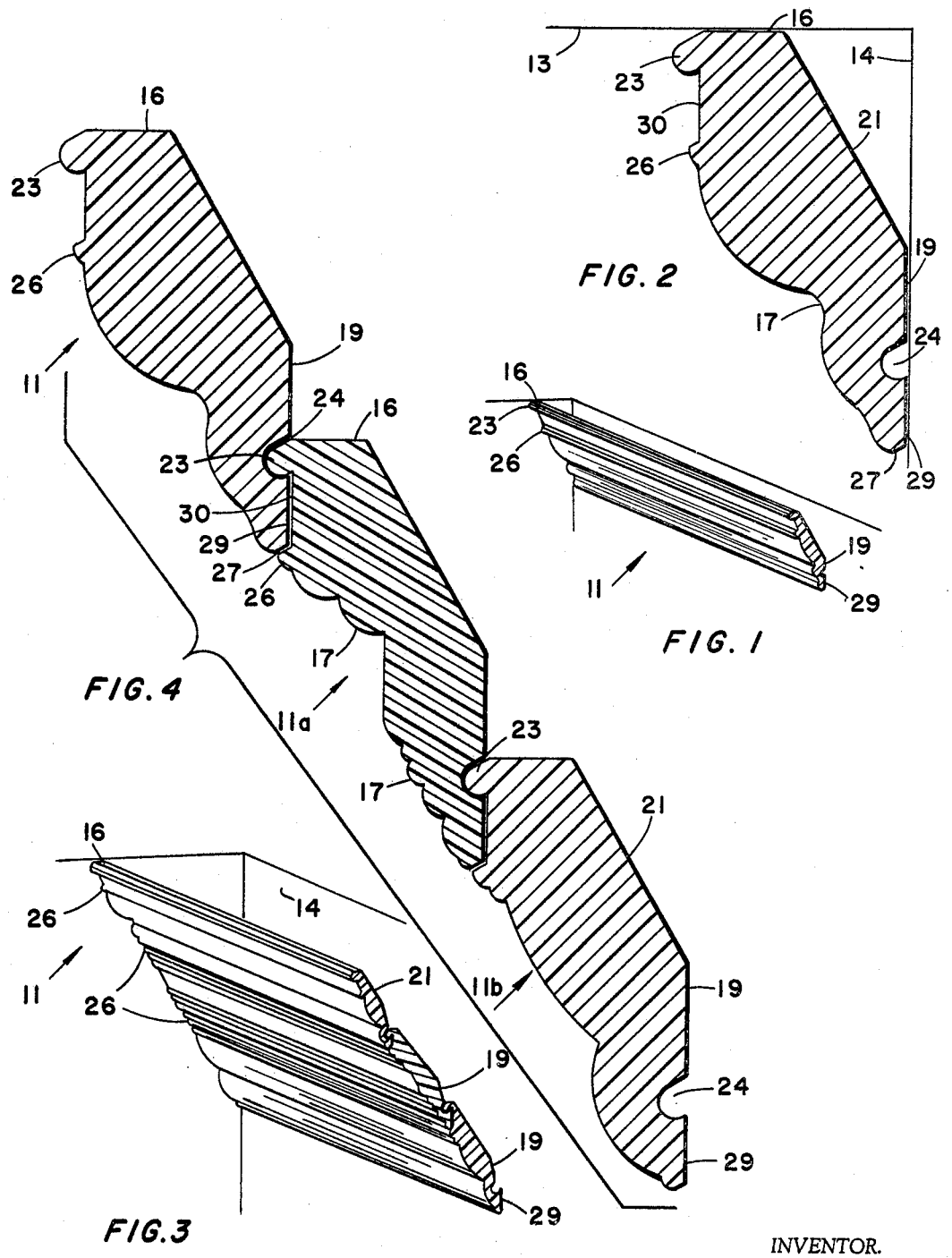
INVENTOR.
NICHOLAS B. CONSTANTINO
BY
ATTORNEY

United States Patent Office 3,481,092
Patented Dec. 2, 1969

3,481,092
CEILING MOLDING
Nicholas B. Constantino, Indianapolis, Ind., assignor to Eli Lilly and Company, a corporation of Indiana
Filed Feb. 1, 1968, Ser. No. 702,288
Int. Cl. E04f *19/04*
U.S. Cl. 52—288          7 Claims

ABSTRACT OF THE DISCLOSURE

A decorative ceiling molding molded from a light-weight plastic material and comprising several bars each having a decorative front surface for interlocking with the back surface of an adjacent bar to combine the decorative surfaces of the bars into wider and more ornate moldings.

Background of the invention

This invention relates to molding for installation at the junction of ceilings and interior walls and, in particular, to a decorative molding formed from a light-weight plastic material adapted for interlocking with other moldings to provide selective combinations thereof.

Ceiling moldings have been generally formed from wood. The expense involved in forming wooden ceiling moldings into suitable decorative configurations has increased considerably. Likewise, the cost of wood itself has increased to the point that it is now desirable to utilize synthetic materials. Thus, laminations of fibrous sheet material have been utilized to form ceiling moldings. However, in all of the aforementioned arrangement it has been necessary to be content with a single design for ceiling molding. Thus, if a contractor wishes to modify the decorative features of the ceiling molding, it becomes necessary for him to expend considerable money for alternative moldings.

Summary of the invention

The ceiling molding of this invention overcomes the above disadvantages by utilizing a light-weight and relatively inexpensive plastic material such as expandable polystyrene which is molded into the desired configuration. In particular, beads of expandable polystyrene may be introduced into a mold, and upon applying suitable heat the beads will become fused to form a solid bar having a decorative surface. The decorative surface comprises several longitudinally extending ridges which serve both decorative and structural functions. A groove is formed on a back surface of the ceiling bar for complementary engagement with a longitudinal ridge on another bar. Thus, the longitudinal ridge on the first bar may be interlocked with the groove on the back of the second bar, thereby providing a more decorative ceiling molding than would be obtained by using a single bar. It is also apparent that if two type of decorative ceiling molding are available, at least three arrangements can be selected by combining two or more of the first type with each other, two or more of the second type or one of each type.

In addition, molding formed from light-weight expandable polystyrene provides added thermal insulative features that are not obtainable from moldings of the prior art.

Thus, it is one object of this invention to provide a new improved ceiling molding formed from a relatively inexpensive plastic material.

Another object of this invention is to provide a new and novel ceiling molding having interlocking surfaces for combining the molding with a second molding.

Another object of this invention is to provide a ceiling molding having increased thermal insulating features.

Brief description of the drawing

FIG. 1 is a perspective view of one section of the ceiling molding of this invention installed in a corner;

FIG. 2 is a transverse section of the ceiling molding of FIG. 1.

FIG. 3 is a perspective view of three assembled sections of ceiling molding; and FIG. 4 is a transverse section of the three assembled ceiling molding sections of FIG. 3.

Description of the preferred embodiment

Referring to FIGS. 1 and 2, a ceiling molding 11 comprising a strip of light-weight plastic material such as expandable polystyrene is shown affixed to ceiling 13 and an adjacent interior wall 14. Ceiling molding 11 has a horizontal top surface 16 which is flat and in flush contact with ceiling 13. A decorative exterior surface is identified by the number 17. A flat vertical back surface 19 of the molding is in flush contact with wall 14. An inclined surface 21 extends between molding surfaces 16 and 19 along the full length of the molding.

On the decorative surface 17 an interlocking bead ridge 23 is formed along the full length of the molding and parallel to its longitudinal axis. On the back surface 19 of the molding a groove 24 is formed which is complementary to interlocking ridge 23. A secondary ridge 26 is provided on the decorative surface in a spaced and parallel relationship with respect to interlocking ridge 23. The bottom edge 27 of the molding is preferably formed for mating with the top surface of secondary ridge 26.

Referring to FIGS. 3 and 4, it is to be noted that the topmost ceiling molding bar 11 is identical to that shown in FIGS. 1 and 2. The second and lowermost ceiling moldings of FIGS. 3 and 4 (11a and 11b) have a different decorative surface but are nevertheless identical to molding 11 with respect to interlocking ridge 23, secondary ridge 26 and groove 24. Lower area 29 of the back surface 19 is of a dimension to snugly fit between interlocking ridge 23 and secondary ridge 26 for flush contact with front vertical surface 30 defined between these two ridges. However, it should be understood that surface 30 need not necessarily be flat or plain and in flush contact with surface 29 inasmuch as an interlocking relationship can be maintained by the tight fit resulting from the action of ridges 23 and 26.

Thus, it can be seen that with two or more styles of ceiling molding a variety of arrangements is available for the contractor. For a less ornate arrangement a single ceiling molding can be used as shown in FIGS. 1 and 2. The expandable polystyrene has a particularly high insulating factor and greatly aids in preventing drafts from passing between the junction of the ceiling and wall. The light-weight properties of this material further enable the ceiling molding to be affixed to the ceiling and wall by a conventional adhesive or by nailing or stapling. No adhesive is necessary for interlocking a pair of insulating bars if a snap fit or friction fit is obtained between the lowermost portion of one bar and the uppermost portion of the adjacent bar.

In the arrangement of FIGS. 3 and 4, three insulating bars may be interlocked in a progressive fashion with adhesive being applied to surface 16 of bar 11 and back surfaces 19 and 29 of bar 11b. The interlocking effects obtained from the interlocking ridges 23 and secondary ridges 26 against grooves 24 and surface 27, respectively, are sufficient to maintain the bars in their illustrated arrangement with or without adhesives.

The moldings of this invention can be formed from a colored material. However, in most instances it will be more desirable to manufacture them in only one color and then subsequently the contractor may paint them. It is also to be understood that these ceiling moldings, in addition to being formed by conventional molding techniques, can be extruded, depending upon the nature of the particular material used.

Although only one embodiment of this invention has been described and illustrated, it will be apparent to those with ordinary skill in the art that additional modifications can be made without departing from the spirit of this invention and the scope of the appended claims.

I claim:

1. A molding of light-weight expanded plastic material in combination wtih a horizontal ceiling with an adjacent vertical wall, said molding comprising a plurality of bars, each of said bars having a horizontally flat top surface in contact with the ceiling, a decorative front surface with an interlocking ridge adjacent and parallel to said top surface, a vertical back surface having at least one groove which is lower, parallel and complementary to said ridge, said groove being offset from said ridge with respect to said ridge's vertical and horizontal coordinates such that the interlocking of said groove in a first bar with said ridge of a second bar effects an offset and descending molding with only said top surface of said topmost bar abutting the ceiling and only said back surface of said lowermost bar abutting an adjacent vertical wall.

2. A ceiling molding as defined in claim 1 in which said bars are retained in their interlocking relationship by a force-fit between said complementary groove and ridge.

3. A ceiling molding as defined in claim 2 in which said exterior surface has a second ridge parallel and spaced with respect to said interlocking ridge, said secondary ridge adapted for supporting contact with a bottom edge of a bar positioned immediately thereabove.

4. A ceiling molding as defined in claim 3 in which the portion of said exterior surface between said interlocking ridge and said secondary ridge is of a predetermined dimension to snugly receive the portion of said vertical back surface extending from the bottom edge to said groove of a bar positioned immediately thereabove.

5. A ceiling molding as defined in claim 4 in which the portion of said exterior surface between said interlocking ridge and said secondary ridge is flat and vertical.

6. A ceiling molding as defined in claim 5 in which each of said bars has an inclined back surface extending from said vertical back surface to said horizontal top surface.

7. A ceiling molding as defined in claim 6 in which said light-weight plastic material comprises polystyrene.

References Cited

UNITED STATES PATENTS

| 646,236 | 3/1900 | Prutsman | 52—287 |
| 1,944,070 | 1/1934 | Esdorn | 52—288 |
| 2,253,489 | 8/1941 | Smith | 52—287 |
| 3,003,810 | 10/1961 | Kloote | 52—288 X |
| 485,377 | 11/1892 | Glover | 52—716 |
| 1,076,975 | 10/1913 | Goodrow | 52—716 |
| 3,200,547 | 8/1965 | Johnson | 52—716 |

OTHER REFERENCES

POLY-BLOCK, published by American Calmoc Corp. of 1465 S. Strong Ave., Coprogue, N.Y., copy received Mar. 10, 1966, 4 pages.

JOHN E. MURTAGH, Primary Examiner

U.S. Cl. X.R.

52—309, 536